US011887317B2

(12) United States Patent
Ivanovic et al.

(10) Patent No.: US 11,887,317 B2
(45) Date of Patent: Jan. 30, 2024

(54) OBJECT TRAJECTORY FORECASTING

(71) Applicants: Ford Global Technologies, LLC, Dearborn, MI (US); The Board of Trustees of the Leland Stanford Junior University, Stanford, CA (US)

(72) Inventors: Boris Ivanovic, Stanford, CA (US); Yifeng Lin, Sunnyvale, CA (US); Shubham Shrivastava, Sunnyvale, CA (US); Punarjay Chakravarty, Campbell, CA (US); Marco Pavone, Stanford, CA (US)

(73) Assignees: Ford Global Technologies, LLC, Dearborn, MI (US); The Board of Trustees of the Leland Stanford Junior University, Stanford, CA (US)

( * ) Notice: Subject to any disclaimer, the term of this patent is extended or adjusted under 35 U.S.C. 154(b) by 323 days.

(21) Appl. No.: 17/460,776

(22) Filed: Aug. 30, 2021

(65) Prior Publication Data
US 2023/0074293 A1    Mar. 9, 2023

(51) Int. Cl.
*G06T 7/277* (2017.01)
*G06T 7/70* (2017.01)
(Continued)

(52) U.S. Cl.
CPC ............. *G06T 7/277* (2017.01); *B60W 10/04* (2013.01); *B60W 10/18* (2013.01); *B60W 10/20* (2013.01);
(Continued)

(58) Field of Classification Search
CPC ........... G06T 7/277; G06T 7/70; G06T 7/246; G06T 2207/20081; G06T 2207/20084;
(Continued)

(56) References Cited

U.S. PATENT DOCUMENTS 10,361,802 B1 *  7/2019  Hoffberg-Borghesani ................. G06F 3/00
10,997,729 B2 *  5/2021  Zhang ........................ G06T 7/11
(Continued)

FOREIGN PATENT DOCUMENTS

DE     102017204404 B3     6/2018

OTHER PUBLICATIONS

Walker, J. C., "Data-Driven Visual Forecasting," The Robotics Institute, Carnegie Mellon University, Pittsburgh, Pennsylvania 15213, Apr. 2018, 102 pages.

*Primary Examiner* — Hai H Huynh
(74) *Attorney, Agent, or Firm* — Frank A. Mackenzie; Bejin Bieneman PLC

(57) ABSTRACT

A plurality of agent locations can be determined at a plurality of time steps by inputting a plurality of images to a perception algorithm that inputs the plurality of images and outputs agent labels and the agent locations. A plurality of first uncertainties corresponding to the agent locations can be determined at the plurality of time steps by inputting the plurality of agent locations to a filter algorithm that inputs the agent locations and outputs the plurality of first uncertainties corresponding to the plurality of agent locations. A plurality of predicted agent trajectories and potential trajectories corresponding to the predicted agent trajectories can be determined by inputting the plurality of agent locations at the plurality of time steps and the first uncertainties corresponding to the agent locations at the plurality of time steps to a variational autoencoder. The plurality of predicted agent trajectories and the potential trajectories corresponding to the predicted agent trajectories can be output.

20 Claims, 10 Drawing Sheets

(51) Int. Cl.
   *B60W 10/18*   (2012.01)
   *B60W 10/20*   (2006.01)
   *B60W 10/04*   (2006.01)
   *G08G 1/01*    (2006.01)
   *B60W 40/04*   (2006.01)
   *G06N 3/044*   (2023.01)
   *G06N 3/045*   (2023.01)

(52) U.S. Cl.
   CPC ............. *B60W 40/04* (2013.01); *G06N 3/044* (2023.01); *G06N 3/045* (2023.01); *G06T 7/70* (2017.01); *G08G 1/0112* (2013.01); *G08G 1/0116* (2013.01); *G06T 2207/20081* (2013.01); *G06T 2207/20084* (2013.01); *G06T 2207/30252* (2013.01)

(58) Field of Classification Search
   CPC . G06T 2207/30252; G06T 2207/10016; G06T 2207/10028; G06T 2207/30196; G06T 2207/30236; G06T 2207/30241; G06T 2207/30261; G06N 3/0442; G06N 3/0445; G06N 3/0464; G06N 3/0475; G06N 3/044; G06N 3/045; B60W 10/04; B60W 10/18; B60W 10/20; B60W 40/04; G08G 1/0112; G08G 1/0116; G08G 1/0129; G08G 1/04; G08G 1/164
   USPC .................................................... 701/41, 48
   See application file for complete search history.

(56) References Cited

U.S. PATENT DOCUMENTS

| | | | |
|---|---|---|---|
| 11,126,179 B2* | 9/2021 | Karasev | G01S 17/86 |
| 11,155,259 B2* | 10/2021 | Yao | B60W 30/09 |
| 11,475,577 B2* | 10/2022 | Slocum | G06T 13/40 |
| 11,514,293 B2* | 11/2022 | Villegas | B60W 40/02 |
| 2018/0339710 A1* | 11/2018 | Hashimoto | B60W 40/04 |
| 2018/0374359 A1* | 12/2018 | Li | G08G 1/163 |
| 2020/0082248 A1* | 3/2020 | Villegas | G06N 3/044 |
| 2020/0174481 A1 | 6/2020 | Van Heukelom et al. | |

* cited by examiner

OBJECT TRAJECTORY FORECASTING

BACKGROUND

Deep neural networks can be trained to perform a variety of computing tasks. For example, neural networks can be trained to extract data from images. Data extracted from images by deep neural networks can be used by computing devices to operate systems including vehicles, robots, security, product manufacturing and product tracking. Images can be acquired by sensors included in a system and processed using deep neural networks to determine data regarding objects in an environment around a system. Operation of a system can include upon acquiring accurate and timely data regarding objects in a system's environment.

DETAILED DESCRIPTION

Figure 1:
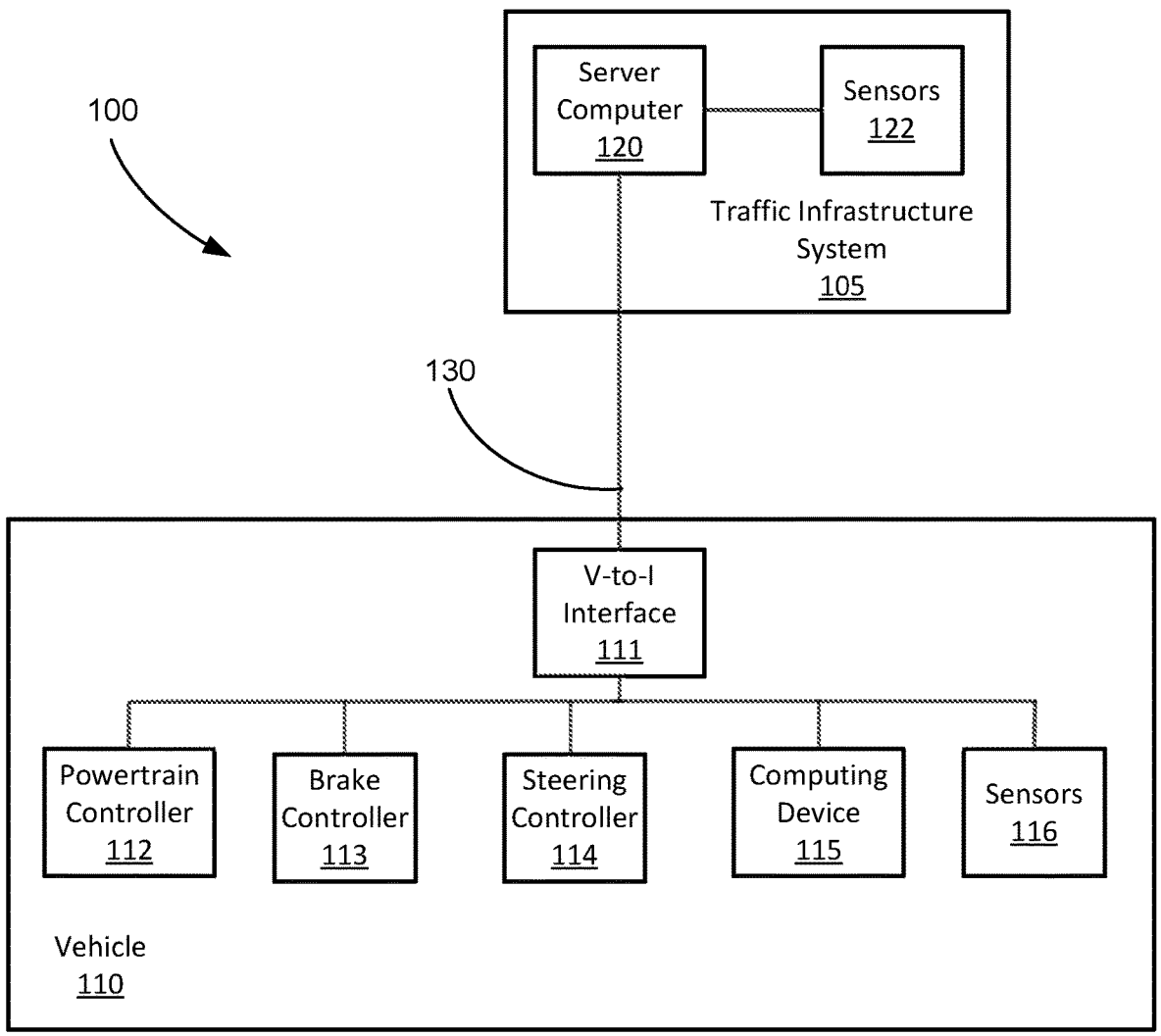
FIG. 1 is a block diagram of an example object detection system.

A deep neural network (DNN) can be trained and then used to determine objects in image data acquired by sensors in systems including vehicle guidance, robot operation, security, manufacturing, and product tracking. Vehicle guidance can include operation of vehicles in autonomous or semi-autonomous modes in environments that include a plurality of objects. Robot guidance can include guiding a robot end effector, for example a gripper, to pick up a part and orient the part for assembly in an environment that includes a plurality of parts. Security systems include features where a computer acquires video data from a camera observing a secure area to provide access to authorized users and detect unauthorized entry in an environment that includes a plurality of users. In a manufacturing system, a DNN can determine the location and orientation of one or more parts in an environment that includes a plurality of parts. In a product tracking system, a deep neural network can determine a location and orientation of one or more packages in an environment that includes a plurality of packages.

Vehicle guidance will be described herein as a non-limiting example of using a DNN to detect objects, for example vehicles and pedestrians, in a traffic scene and determine trajectories and uncertainties corresponding to the trajectories. A traffic scene is an environment around a traffic infrastructure system or a vehicle that can include a portion of a roadway and objects including vehicles and pedestrians, etc. For example, a computing device in a traffic infrastructure can be programmed to acquire one or more images from one or more sensors included in the traffic infrastructure system and detect objects in the images using a DNN. The images can be acquired from a still or video camera and can include range data acquired from a range sensor including a lidar sensor. The images can also be acquired from sensors included in a vehicle. A DNN can be trained to label and locate objects and determine trajectories and uncertainties in the image data or range data. A computing device included in the traffic infrastructure system can use the trajectories and uncertainties of the detected objects to determine a vehicle path upon which to operate a vehicle in an autonomous or semi-autonomous mode. A vehicle can operate based on a vehicle path by determining commands to direct the vehicle's powertrain, braking, and steering components to operate the vehicle to travel along the path.

A traffic scene can include a plurality of objects such as vehicles and pedestrians that move and interact. Objects such as these that are capable of movement in a traffic scene will also be referred to herein as agents. Determining a vehicle path upon which to operate a vehicle can be improved by predicting a plurality of future locations, i.e., trajectories, of agents in a traffic scene based on an environment around the vehicle. A trajectory is a vector that describes a direction and a speed at which an agent is moving. A variational autoencoder (VAE) is a type of DNN that can input location histories for a plurality of agents based on observed locations and output predicted trajectories for the plurality of agents along with uncertainties corresponding the predicted trajectories. Location histories can be determined by inputting a plurality of images acquired at a plurality of time steps to a convolutional neural network (CNN), which is a type of DNN that can determine agent locations in each input image. The uncertainties are probability distributions corresponding to the predicted trajectories that estimate probabilities that an observed trajectory of an agent will differ from the predicted trajectory. Techniques discussed herein improve determining predicted trajectories of agents by determining uncertainties corresponding to observed locations of agents and inputting both the locations and uncertainties to a VAE to determine predicted agent trajectories and uncertainties.

A method is disclosed herein, including determining a plurality of agent locations at a plurality of time steps by inputting a plurality of images to a perception algorithm that inputs the plurality of images and outputs agent labels and the agent locations. A plurality of first uncertainties corresponding to the agent locations at the plurality of time steps can be determined by inputting the plurality of agent locations to a filter algorithm that inputs the agent locations and outputs the plurality of first uncertainties corresponding to the plurality of agent locations. A plurality of predicted agent trajectories and potential trajectories corresponding to the predicted agent trajectories can be determined by inputting the plurality of agent locations at the plurality of time steps and the plurality of first uncertainties corresponding to the agent locations at the plurality of time steps to a variational autoencoder and the plurality of predicted agent trajectories and the potential trajectories corresponding to the predicted agent trajectories can be output.

A vehicle can be operated based on the plurality of predicted agent trajectories and the potential trajectories corresponding to the predicted agent trajectories. The vehicle can be operated by controlling one or more of vehicle powertrain, vehicle brakes, and vehicle steering. The perception algorithm can be a deep neural network. The deep neural network can be a convolutional neural network that includes convolutional layers and fully connected layers. The agent locations can be x coordinates and y coordinates in a plane. The x coordinates and the y coordinates in the plane can be determined based on a high definition map. The filter algorithm can be a Kalman filter. The first uncertainties can correspond to the agent locations at the plurality of time steps correspond to Gaussian distributions. The variational autoencoder can include encoders, latent variables, and decoders. The variational autoencoder can include a plurality of long short-term memory (LSTM) neural networks and one or more convolutional neural networks. The latent variables can include concatenated outputs from the plurality of LSTM neural networks and the one or more convolutional neural networks. The variational autoencoder can include one or more recurrent neural networks that input agent locations and uncertainties and output predicted agent trajectories and the potential trajectories corresponding to the predicted agent trajectories. Training the variational autoencoder can include determining ground truth corresponding to the predicted agent trajectories and the potential trajectories corresponding to the predicted agent trajectories.

Further disclosed is a computer readable medium, storing program instructions for executing some or all of the above method steps. Further disclosed is a computer programmed for executing some or all of the above method steps, including a computer apparatus, programmed to determine a plurality of agent locations at a plurality of time steps by inputting a plurality of images to a perception algorithm that inputs the plurality of images and outputs agent labels and the agent locations. A plurality of first uncertainties corresponding to the agent locations at the plurality of time steps can be determined by inputting the plurality of agent locations to a filter algorithm that inputs the agent locations and outputs the plurality of first uncertainties corresponding to the plurality of agent locations. A plurality of predicted agent trajectories and potential trajectories corresponding to the predicted agent trajectories can be determined by inputting the plurality of agent locations at the plurality of time steps and the plurality of first uncertainties corresponding to the agent locations at the plurality of time steps to a variational autoencoder and the plurality of predicted agent trajectories and the potential trajectories corresponding to the predicted agent trajectories can be output.

The computer can be further programmed to operate a vehicle based on the plurality of predicted agent trajectories and the potential trajectories corresponding to the predicted agent trajectories. The vehicle can be operated by controlling one or more of vehicle powertrain, vehicle brakes, and vehicle steering. The perception algorithm can be a deep neural network. The deep neural network can be a convolutional neural network that includes convolutional layers and fully connected layers. The agent locations can be x coordinates and y coordinates in a plane. The x coordinates and the y coordinates in the plane can be determined based on a high definition map. The filter algorithm can be a Kalman filter. The first uncertainties can correspond to the agent locations at the plurality of time steps correspond to Gaussian distributions. The variational autoencoder can include encoders, latent variables, and decoders. The variational autoencoder can include a plurality of long short-term memory (LSTM) neural networks and one or more convolutional neural networks. The latent variables can include concatenated outputs from the plurality of LSTM neural networks and the one or more convolutional neural networks. The variational autoencoder can include one or more recurrent neural networks that input agent locations and uncertainties and output predicted agent trajectories and the potential trajectories corresponding to the predicted agent trajectories. Training the variational autoencoder can include determining ground truth corresponding to the predicted agent trajectories and the potential trajectories corresponding to the predicted agent trajectories.

FIG. 1 is a diagram of an object detection system 100 that can include a traffic infrastructure system 105 that includes a server computer 120 and sensors 122. Object detection system includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
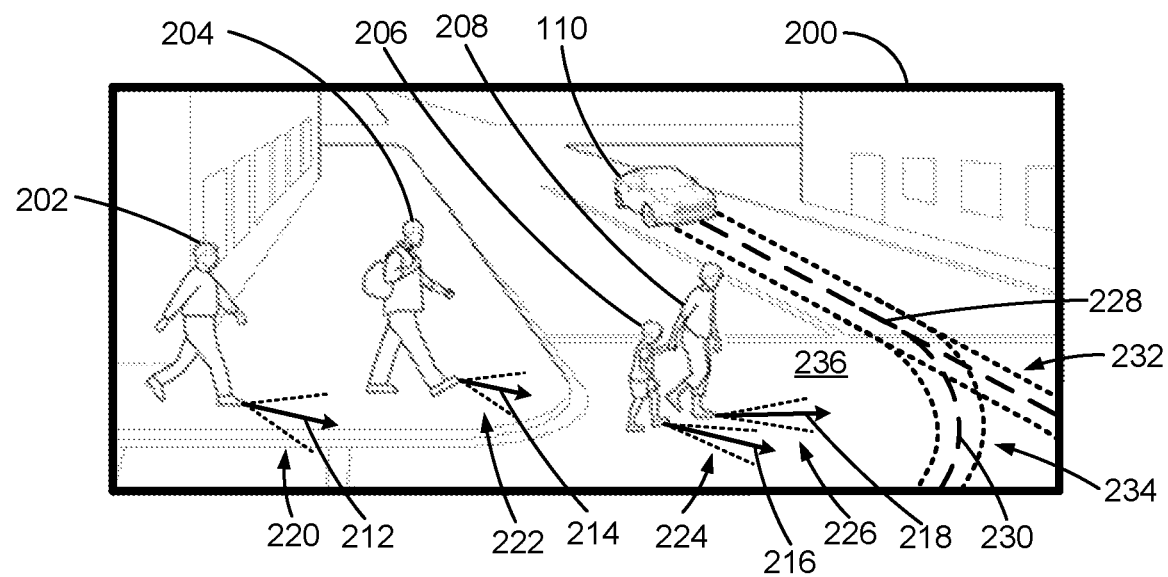
FIG. 2 is a diagram of an example image of a traffic scene.

FIG. 2 is a diagram of an image of a traffic scene 200. The image of the traffic scene 200 can be acquired by a sensor 122 included in a traffic infrastructure system 105 or a sensor 116 included in a vehicle 110. The image of the traffic scene 200 includes pedestrians 202, 204, 206, 208 and a vehicle 110 on a roadway 236. Techniques described herein can determine predicted trajectories 212, 214, 216, 218 for pedestrians 202, 204, 206, 208, respectively. Techniques described herein can also predict trajectories 228, 230 for vehicle 110. Trajectories 228, 230 can be predicted by a VAE as described herein, or trajectories 228, 230 can be determined by receiving from a computing device 115 in a vehicle, one or more planned trajectories included in a vehicle path upon which vehicle 110 intends to travel. Pedestrians 202, 204, 206, 208 can also have more than one predicted trajectory. Corresponding to each trajectory 212, 214, 216, 218, 228, 230 are potential trajectories 220, 222, 224, 226, 232, 234 (dotted lines). Potential trajectories 220, 222, 224, 226, 232, 234 are Gaussian probability distributions, where the predicted trajectories 212, 214, 216, 218, 228, 230 correspond to the most probable trajectories within the respective potential trajectories 220, 222, 224, 226, 232, 234. Computing device 115 can input predicted trajectories 212, 214, 216, 218, 228, 230 and potential trajectories 220, 222, 224, 226, 232, 234 to determine a vehicle path upon which to operate vehicle 110.

Figure 3:
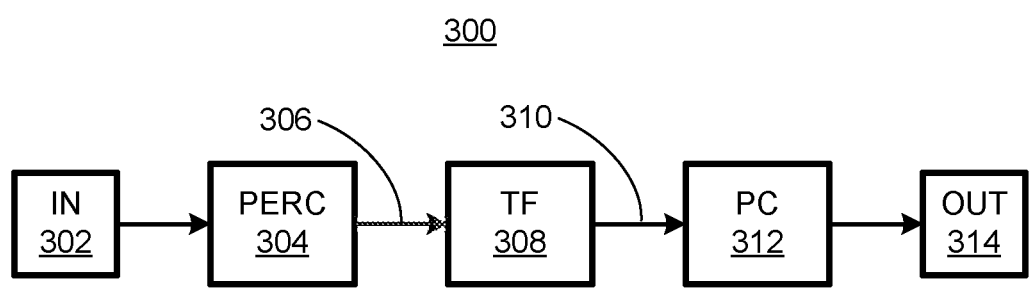
FIG. 3 is a diagram of an autonomous vehicle control system.

FIG. 3 is a diagram of an autonomous vehicle control system 300. Autonomous vehicle control system 300 include input images (IN) 302, perception (PREC) 304, trajectory forecasting (TF) 308, planning and control (PC) 312, and output control signals 314. Autonomous vehicle control system 300 can be included in a vehicle 110, where input images 302 are acquired by sensors 116, perception 304, trajectory forecasting 308, and planning and control 312 are software programs executing on computing device 115. Autonomous vehicle control system 300 can also be included in a traffic infrastructure system 105, where input images are acquired by sensors 122 and all or portions of perception 304, trajectory forecasting 308 and planning and control 312 are executed on server computer 120. For example, perception 304 and trajectory forecasting 308 can be executed on traffic infrastructure system 105 and planning and control 312 can be executed on computing device 115 included in a vehicle 110. Perception 304 outputs agent locations and uncertainties 306 to trajectory forecasting 308, which in turn outputs predicted trajectories and potential trajectories 310 to planning and control 312 which outputs control signals 314 to controllers 112, 113, 114 to control vehicle powertrain, vehicle steering, and vehicle brakes.

Perception 304 inputs a plurality of images 302 and outputs labeled agent locations and uncertainties. Agent locations are typically determined with respect to a global coordinate system, e.g., a Cartesian or polar coordinate system with a defined point of origin, by combining locations output by perception 304 as locations determined as pixel locations in an image with data regarding the location and orientation of the sensor 116 that acquired the image with respect to the vehicle and data regarding the location and orientation of the vehicle. Data regarding the location and orientation of a sensor 116 with respect to the vehicle can be determined at the time of manufacture by acquiring an image of fiducial pattern placed at a measured location with respect to a vehicle 110, for example. The location and orientation of a vehicle can be determined by GPS and accelerometer-based inertial measurement units (IMUs) included in a vehicle 110, for example.

Perception 304 can include a machine learning software program that inputs an image 302 and outputs labeled agent locations. An example of a machine learning software program that can input an image 302 and output labeled agent locations is a deep neural network (DNN) discussed in relation to FIG. 4, below. For example, a DNN can input an image such as an image of a traffic scene 200 and determine labels and locations for pedestrians 202, 204, 206, 208 as "Pedestrian1 $(x_1, y_1)$", "Pedestrian2 $(x_2, y_2)$", "Pedestrian3 $(x_3, y_3)$", "Pedestrian4 $(x_4, y_4)$", respectively, where $(x_i, y_i)$ is the location of agent i in real world coordinates. By labeling each agent with a unique label, the agents can be tracked over a plurality of images 302 to determine agent histories.

After labeled agent locations are determined for a plurality of images 302, the agent locations can be grouped according to labels to determine agent histories and input to filtering software to determine uncertainties corresponding to the labeled agent locations. An example of filtering software that can determine uncertainties based on a plurality of input location measurements is a Kalman filter. A Kalman filter can be implemented as a software program on server computer 120 or computing device 115. A Kalman filter inputs a time series of measurements such as locations that can include statistical noise or errors and output estimated locations that improve the accuracy of the noisy input locations by determining a joint probability distribution of the input locations. The covariance of the estimated location can be output along with the estimated locations as the uncertainty corresponding to the estimated location. Kalman filters operate by comparing a predicted location based on a physical motion model to the observed location and updating an estimated location based on the comparison and the joint probability distribution.

Agent locations and uncertainties 306 are input to trajectory forecasting 308. Trajectory forecasting 308 includes a variational autoencoder (VAE), a deep neural network described in relation to FIG. 5, below. Trajectory forecasting systems that predict agent locations based on observations are subject to epistemic uncertainty, or uncertainty caused by variations or error in the observations. Typically, trajectory forecasting systems treat their input information as being certain. Thus, any uncertainty information produced by upstream object detectors or trackers is not propagated through trajectory forecasting methods to downstream planning and control modules. Instead, the only uncertainty incorporated in planning and control is the epistemic uncertainty of the trajectory forecasting module. Techniques discussed herein improve trajectory forecasting by propagating state uncertainty from perception through trajectory forecasting, producing predictions with epistemic uncertainty from both perception and trajectory forecasting.

Trajectory forecasting 308, inputs a time-varying set of input data that is expressed as a series of states $x_i$ for each agent i at a time $t_i$:

$$\begin{bmatrix} x_1^{t-n} & x_1^{t-n+1} & \cdots & x_1^{t-1} \\ x_2^{t-n} & x_2^{t-n+1} & \cdots & x_2^{t-1} \\ & & \vdots & \\ x_m^{t-n} & x_m^{t-n+1} & \cdots & x_m^{t-1} \end{bmatrix} \quad (1)$$

Trajectory forecasting 308 inputs the time-varying input data from (1) and outputs a series of future states $y_i$, one for each agent at a future time $t_i$:

$$\begin{bmatrix} y_1^t & y_1^{t+1} & \cdots & y_1^{t+n} \\ y_2^t & y_2^{t+1} & \cdots & y_2^{t+n} \\ & & \vdots & \\ y_m^t & y_m^{t+1} & \cdots & y_m^{t+n} \end{bmatrix} \quad (2)$$

The probability distribution $P_\theta(z|x)$ of latent variables $z$ included in the VAE included in trajectory forecasting 308, conditional on the input x, is intractable and so is approximated by $q_\theta(z|x)$, which is constrained to a Gaussian distribution $P_\theta(z)$ over the latent variables $z$. The probability distribution $q_\varphi(z|x)$ can be determined using a Kullback-Liebler (KL) divergence term in the loss function used to train the VAE:

$$KL(q_\varphi(z|x) \| P_{74}(z)) \quad (3)$$

Added to this is a reconstruction error term based on reconstructing y from x using a log-loss function:

$$\log[P_\psi(y|z,x)] \quad (4)$$

Which can be calculated by repeatedly sampling from the latent space $z$ and taking the expectation of the samples:

$$\mathbb{E}_{q_\varphi(z|x)} \log[P_\psi(y|z,x)] \qquad (5)$$

In addition to the KL-divergence and the expectation over the log-loss function, a mutual information term is added that represents the input data x in the latent space $z$ that includes the mutual information $I_q(x, z)$ between the x and $z$ terms under the distribution $q_\varphi(z|x)$. In addition to these terms, because the input includes an uncertainty in the location of the agents $\Sigma$ along with the input location of the agents x, the ground truth includes a location uncertainty $\Sigma$ along with the location y. Because the input includes an uncertainty concatenated with the location x, the loss function is modified by including a Bhattacharyya distance measure defined as:

$$D_{Bh}(p,q) = \int \sqrt{p(x)q(x)} dx \qquad (6)$$

The Bhattacharyya distance, $D_{Bh}$, is used to bring closer the probability distribution of the output of the network to the ground truth position of an agent over time. The Bhattacharyya distance includes the uncertainty of the input location $\Sigma$ along with the location x, while the ground truth also includes the uncertainty of the location $\Sigma$ along with the location y. The final loss function, modified to include the Bhattacharya distance between the output probability distribution of the agent and a Gaussian distribution of the ground truth location $N(y, \Sigma)$ with standard deviation $\Sigma$ is given by:

$$\max_{\varphi,\theta,\psi} \left( \mathbb{E}_{q_\varphi(z|x)} \log[P_\psi(y|z,x)] - D_{Bh}(P_\psi(y|z,x,\Sigma), N(y,\Sigma)) \atop -\beta KL(q_\varphi(z|x) \| P_\theta(z)) + \alpha I_q(x,z) \right) \qquad (7)$$

Which is maximized over the parameters of the neural networks corresponding to the encoder, decoder, and latent space portion of the VAE, namely φ, θ, ψ, respectively. β and α are weighting parameters for the KL-divergence and mutual information terms. The loss function (7) is used to compare trajectories and potential trajectories output from a VAE as described in relation to FIG. 5, below with ground truth trajectories and potential trajectories determined by observing agents in real world traffic scenes. Ground truth refers to data values determined independently from a DNN, in this example a VAE. The ground truth is compared to output values to determine a loss function that is optimized to determine weights that program the layers of the VAE, i.e., to produce outputs that most closely correspond to the ground truth.

Figure 4:
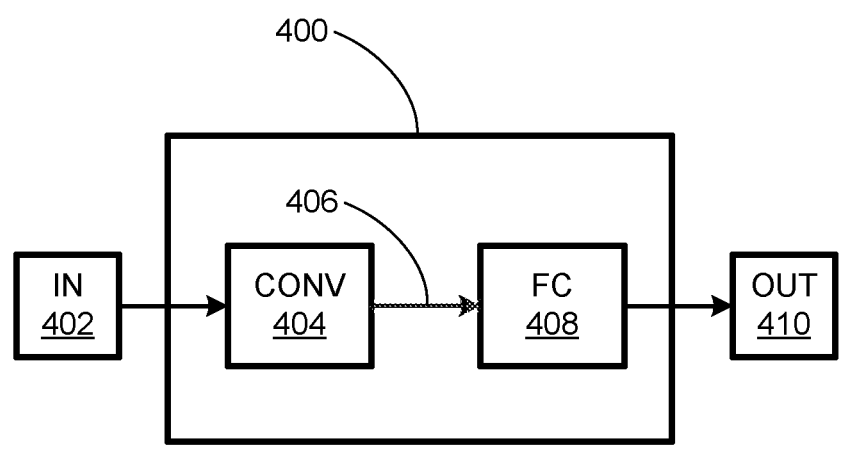
FIG. 4 is a diagram of an example deep neural network.

FIG. 4 is a diagram of a deep neural network (DNN) 400. A DNN 400 can be a software program executing on a computing device 115 or a server computer 120 included in an object detection system 100. In this example DNN 400 is illustrated as a convolutional neural network (CNN). Techniques described herein can also apply to DNNs that are not implemented as CNNs. A DNN 400 implemented as a CNN typically inputs an input image (IN) 402 as input data. The input image 402 can include one or more objects, also referred to as agents herein. The input image 402 is processed by convolutional layers 404 to form latent variables 406 (i.e., variables passed between neurons in the DNN 400). Convolutional layers 404 include a plurality of layers that each convolve an input image 402 with convolution kernels that transform the input image 402 and process the transformed input image 402 using algorithms such as max pooling to reduce the resolution of the transformed input image 402 as it is processed by the convolutional layers 404.

The latent variables 406 output by the convolutional layers 404 are passed to fully connected layers 408. Fully connected layers 408 include processing nodes. Fully connected layers 408 process latent variables 406 using linear and non-linear functions to determine an output prediction (OUT) 410. In examples discussed herein the output prediction 410 includes an agent label and an agent location. DNN 400 can be a software program executing on a server computer 120 in a traffic infrastructure system 105. The server computer 120 can input RGB images acquired by sensors 122 including RGB-D cameras included in traffic infrastructure system 105.

DNN 400 can be trained using a training dataset that includes images and corresponding ground truth. Training datasets for a DNN 400 can include thousands or millions of images and corresponding annotations or ground truth. Each image of the training dataset can be processed a plurality of times by the DNN 400. A prediction 410 output from the DNN 400 in response to an input image 402 is compared to the ground truth corresponding to the input image 402 to determine a loss function. The loss function is a mathematical function that determines how closely the prediction 410 output from DNN 400 matches the ground truth corresponding to the input image 402. In this example, the ground truth can include agent labels and locations determined by means other than a DNN 400. For example, agent labels and locations can be determined by user inspection of the input images 402. The value determined by the loss function is input to the convolutional layers 404 and fully connected layers 408 of DNN 400 where it is backpropagated to determine weights for the layers that correspond to a minimum loss function. Backpropagation is a technique for training a DNN 400 where a loss function is input to the convolutional layers 404 and fully connected layers 408 furthest from the input and communicated from back-to-front and determining weights for each layer 404, 408 by selecting weights that minimize the loss function. DNN 400 can be trained to determine a label, such as "vehicle" or "pedestrian", etc. and a location in global coordinates determined with respect to a sensor 122 included in a traffic infrastructure system 105 or a sensor 116 included in a vehicle 110.

A DNN 400 can be included in perception 304 to input image data and output labels and locations of agents at a plurality of time steps. The agents can be grouped according to labels to generate groups of agent locations where each group corresponds to a single object. The groups of agent locations can be input to a Kalman filter included in perception 304 to determine uncertainties corresponding to the locations and output the locations and uncertainties 306 to trajectory forecasting 308. Locations and uncertainties 306 of agents can include relationships between agents and histories of agent locations and uncertainties, i.e., a plurality of locations and uncertainties corresponding to a single agent over a plurality of time steps.

Figure 5:
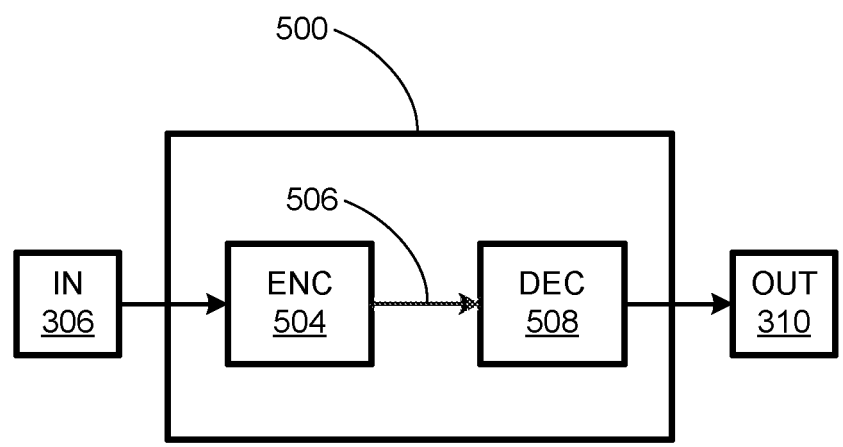
FIG. 5 is a diagram of an example variational autoencoder.

FIG. 5 is a diagram of a variational autoencoder (VAE) 500 that can be included in trajectory forecasting 308. VAE 500 includes encoders, latent variables, and decoders and inputs locations and uncertainties (IN) 306 and outputs predicted trajectories and potential trajectories (OUT) 310 corresponding to input object locations and uncertainties 306. VAE 500 includes an encoder (ENC) 504 that inputs locations and uncertainties 306 corresponding to objects and generates latent variables 506. Encoder 504 can include a plurality of recurrent deep neural networks configured as long short-term memory (LSTM) networks. Recurrent deep neural networks are discussed in relation to FIG. 6, below.

Encoder 504 can include an LSTM network for each object or class of objects to be tracked by VAE 500. Encoder can also include an LSTM network for relationships between agents or types of agents. Agents can be referred to as "nodes" and relationships, e.g., distances, between agents are referred to as "edges" when describing a traffic scene 200. The edges determined based on a plurality of agent types can be grouped according to the type of relationship. For example, relationships between pedestrians and vehicles can be processed by an LSTM network included in encoder 504 to determine how distances between pedestrians and vehicles change over time. In addition to agent locations and uncertainties, agent histories, and agent-agent relationships, an HD map can be input to a CNN included in encoder 504 to locate objects with respect to a roadway 236 in a traffic scene 200. HD maps are discussed in relation to FIG. 7, below.

Agent locations and uncertainties, agent histories, agent-agent relationships, and HD map can be input to encoder 504. LSTM networks and CNNs included in encoder 504 input the agent locations and uncertainties, agent histories, agent-agent relationships, and HD map and output latent variables 506. Latent variables 506 correspond to compressed versions of input data 402, where the encoder 506 has reduced the input locations and uncertainties 306 to latent variables 506 that correspond to essential features of the input locations and uncertainties 306. VAE 500 concatenates output from the LSTM networks and CNNs included in encoder 504 to form the latent variables 506.

Latent variables 506 are input to decoder 508. Decoder 508 is a neural network that inputs latent variables 506 and determines trajectories and potential trajectories (out) 310 corresponding to agent's locations and uncertainties 306 input to VAE 500. The output trajectories and potential trajectories 310 can be output as locations on an HD map as discussed in relation to FIG. 7, below. The potential trajectories can be output as Gaussian distributions for each location. The Gaussian distributions can be determined for each agent by assuming a Gaussian mixture model (GMM), where a continuous 2D function in x and y directions on a plane corresponding to a roadway or an HD map is assumed to include a plurality of Gaussian functions added together. Assuming a Gaussian mixture model can permit determination of the mean and variance for each of the Gaussian distributions that were assumed to be added together to form the Gaussian mixture without requiring any previous information regarding the means and variances.

VAE 500 is trained to output trajectories and potential trajectories 310 using loss function (7) described in relation to FIG. 3, above. The loss function (7) is determined based on comparing trajectories and potential trajectories 310 output from VAE 500 with ground truth trajectories and potential trajectories. The ground truth trajectories and potential trajectories can be determined based on observations of agents in real-world traffic scenes 200 and simulated traffic scenes, for example. Simulated traffic scenes can be generated by photorealistic image rendering software programs such as Unreal Engine, produced by Epic Games, Cary, N.C. 27518. Photorealistic rendering software can take as input a file that includes descriptions of agent locations and appearances and output an image or series of images that include the agents at the described locations. VAE 500 can be executed a plurality of times to generate a plurality of loss function values that are backpropagated through the layers of encoder 504 and decoder 508. Backpropagation applies the loss function values to the layers starting with the layers closest to the output and applies the loss function to the layers of the encoder 504 and decoder 508 from back to front. Weights that determine the processing performed at each layer of the encoder 504 and decoder 508 are adjusted to minimize that loss function value and thereby program VAE 500 to obtain a result the minimizes the difference between the output trajectories and potential trajectories 310 and the ground truth trajectories and potential trajectories.

Figure 8:
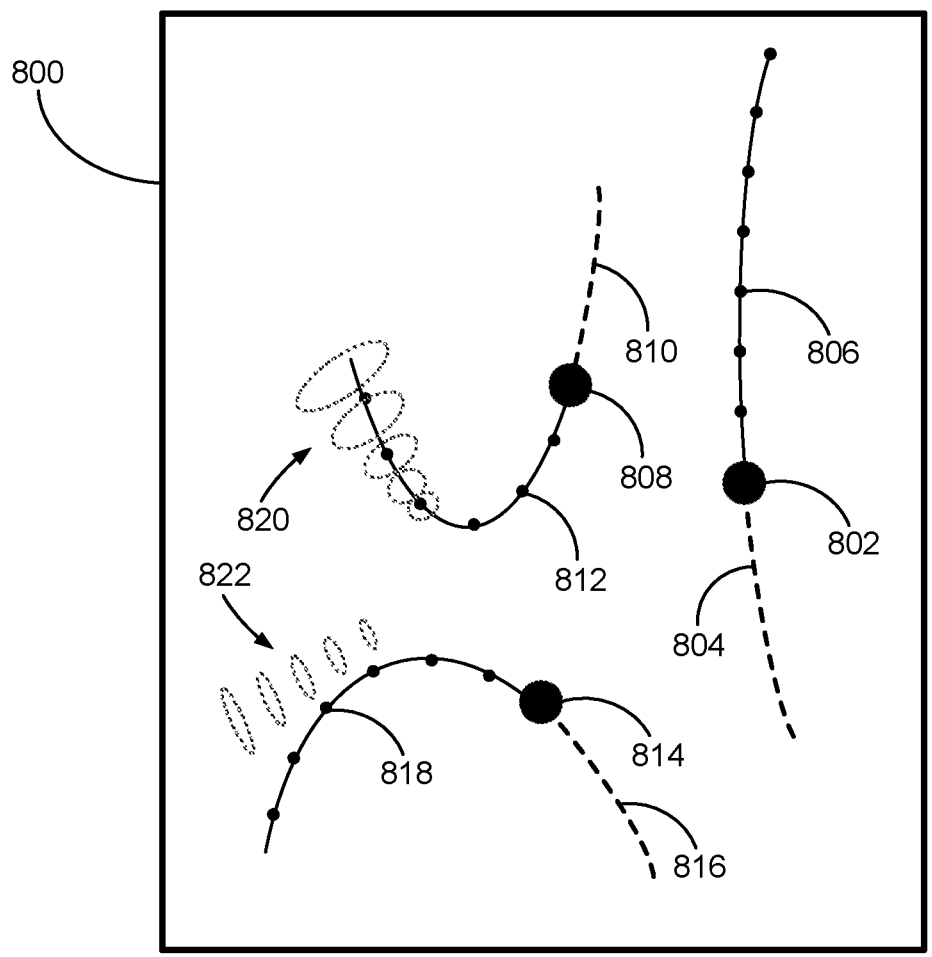
FIG. 8 is a diagram of example results of object trajectory forecasting.
Figure 9:
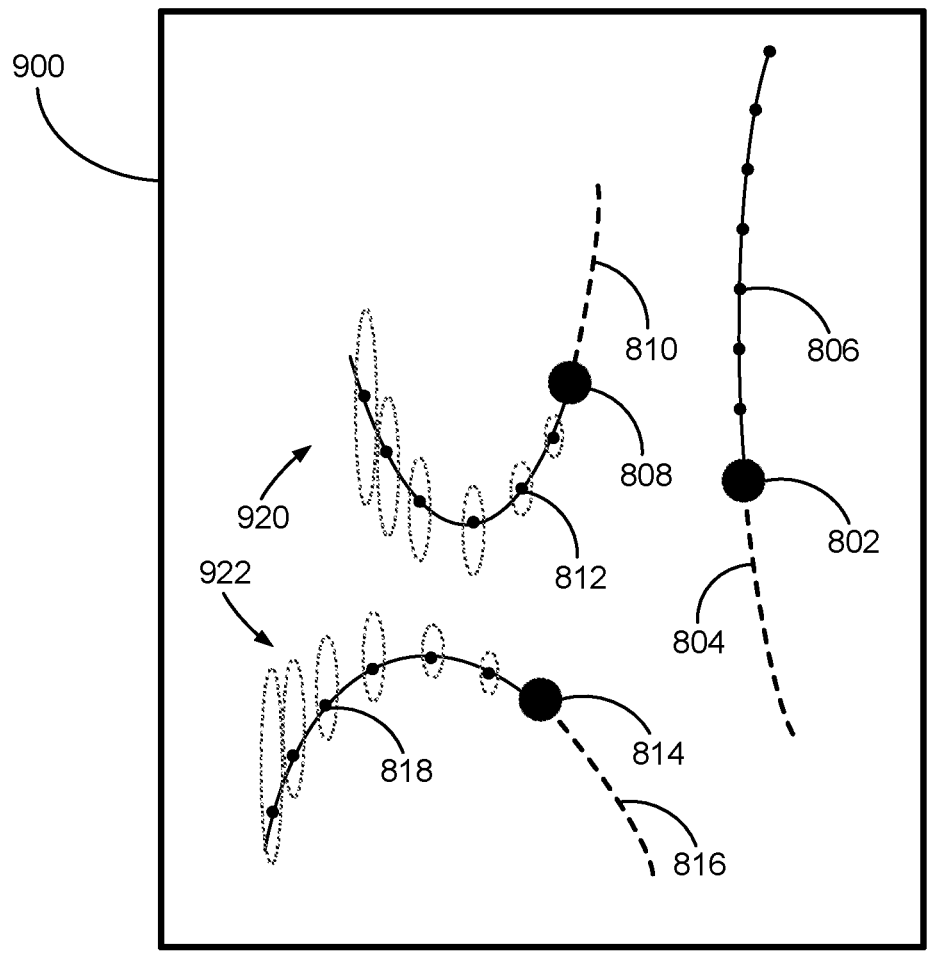
FIG. 9 is another diagram of example results of object trajectory forecasting.

Techniques described herein improve the determination of trajectories and potential trajectories 310 output by VAE 500 by inputting uncertainties corresponding to input agent locations. Techniques described herein further improve determination of trajectories and potential trajectories 310 of agents by determining a loss function (7) based on a Bhattacharyya distance calculation which permits determination of a loss function based on comparing output probability distribution corresponding to output potential trajectories with input uncertainties included in the ground truth. Improved performance of VAE 500 is illustrated in FIGS. 8 and 9, below.

The trajectories and potential trajectories 310 output by VAE 500 can be output to planning and control 312 to operate a vehicle 110 based on the trajectories and potential trajectories 310. Planning and control 312 can be software executing on one or more of a computing device 115 included in a vehicle 110 or a server computer 120 included in a traffic infrastructure system 105. Planning and control 312 can determine a vehicle path upon which to operate a vehicle 110 by determining a vehicle path based on a polynomial function. The polynomial function can be determined by avoiding predicted agent trajectories including potential trajectories. The polynomial function is also determined based on upper and lower limits for lateral and longitudinal accelerations. The vehicle 110 can be operated on the vehicle path by sending commands to controllers 112, 113, 114 to control vehicle powertrain, steering, and brakes.

Figure 6:
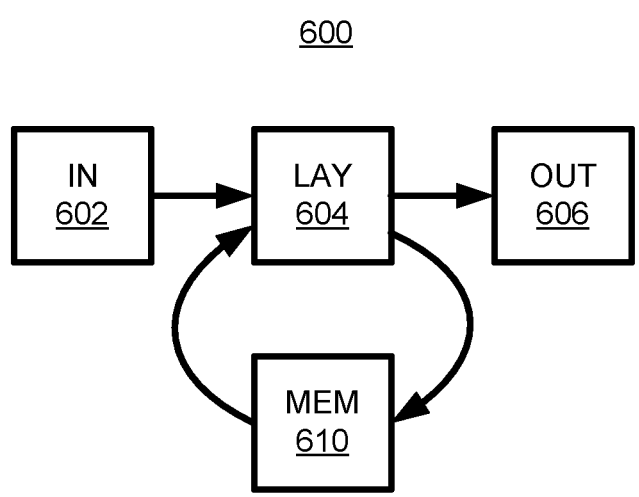
FIG. 6 is a diagram of an example recurrent neural network.

FIG. 6 is a diagram of a recurrent neural network (RNN) 600. RNNs 600 include long short-term memory (LSTM) neural networks. An RNN 600 inputs data (IN) 602, which can be agent locations and uncertainties, agent location histories, or agent-agent (edge) relationship data. RNNs can process time series data, where a plurality of data observations are acquired at a plurality of time step, for example. Input data 602 is input to layers (LAY) 604 of RNN 600 for processing. Layers 604 can include a plurality of convolutional and fully connected layers for processing the input data 602. Data from processing layers 604 is output (OUT) 606 and sent to memory 610. Memory 610 can store a plurality of output data corresponding to a plurality of time steps. Each time new input data 602 is input to layers 604, output data from the previous time step is also input to layers 604. In this fashion, processing at a current time step can be a function of a plurality of previous time steps in addition to the current time step. RNNs 600 are trained in similar fashion to VAEs as discussed above, including determining a loss function (7) based on RNN output 606 and ground truth. In this example ground truth corresponding to each time step should be available to permit determination of the loss function (7) for each time step.

Figure 7:
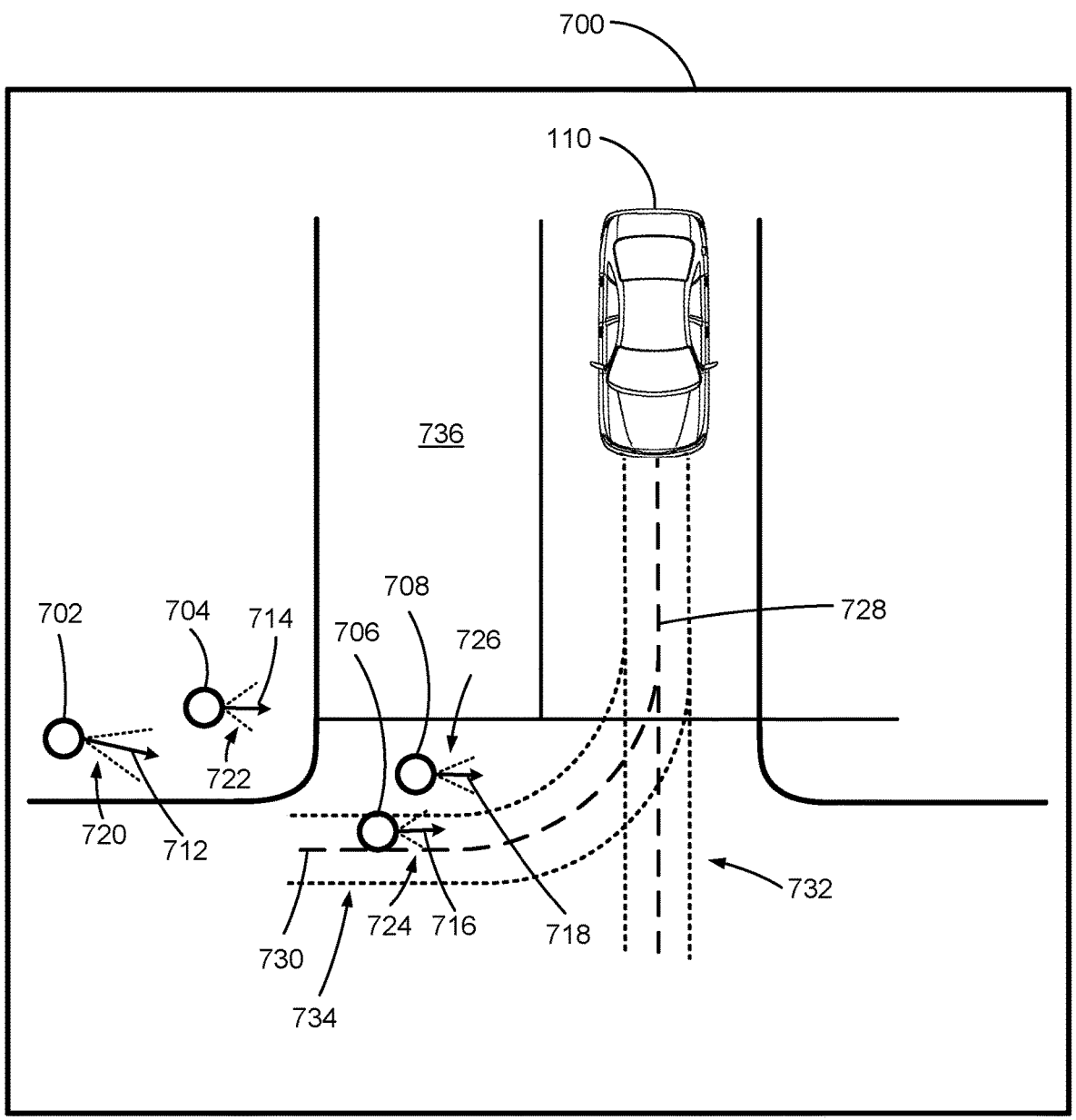
FIG. 7 is a diagram of an example map of a traffic scene.

FIG. 7 is a diagram of a high definition (HD) map 700. An HD map 700 can be determined based on map data downloaded via the Internet from sources such as GOOGLE™ maps. Typically, map data such as GOOGLE maps do not include locations of objects such as roadways 736 with sufficient resolution to permit operation of a vehicle 110 based on the map data. Resolution of map data sufficient to permit operation of a vehicle 110 based on the map is less than about 10 centimeters (cm). A 10 cm resolution permits localization of roadway 736 edges and lane markings sufficient to permit operation of a vehicle 110. The resolution of the downloaded map data can be increased prior to downloading by server computer 120 or computing device 115. Resolution of downloaded map data can also be increased by server computer 120 or computing device 115 based on sensor data acquired by sensors 122 or 116. For example, sensors included in traffic infrastructure system 105 or vehicle 110 can determine the location of roadway 736 edges and lane markings and add them to downloaded map data to increase the resolution of the map data.

HD map 700 includes a roadway 736 and agents 702, 704, 706, 708. VAE 500 can determine trajectory and potential trajectories 310 data for agents 702, 704, 706, 708 as discussed above in relation to FIG. 5 and include it in HD map 700 as trajectories 712, 714, 716, 718 and potential trajectories 720, 722, 724, 726 (dotted lines), respectively. In examples where vehicle 110 is included in the traffic scene included in the HD map 700, desired trajectories 728, 730 (dashed lines) for the vehicle 110 and potential trajectories 732, 734 (dotted lines) can be determined by computing device 115 based on vehicle paths desired to be traveled by the vehicle 110. The desired trajectories 728, 730 can be modified by computing device 115 or server computer 120 depending upon trajectories and potential trajectories 310 determined for agents 702, 704, 706, 708.

FIG. 8 is a diagram of example results 800 from an object trajectory forecasting system based on a VAE 500 that does not include input location uncertainties. Example results 800 include three objects or agents 802, 808 and 814. Location histories 804, 810, 816 are included for agents 802, 808, 814, respectively. Observed trajectories 806, 812, 818 are included for agents 802, 808, 814. Predicted trajectories and potential trajectories 820, 822 (dotted lines) are included for agents 808 and 814. In example results 800, predicted trajectories and potential trajectories 820, 822 are determined without input location uncertainties and without determining a loss function based on a Bhattacharyya distance function. The results 800 exhibit a weak relationship between the predicted trajectories and potential trajectories 820, 822 for agents 808, 814 and observed trajectories 812, 818. A weak relationship between predicted trajectories and potential trajectories 820, 822 for agents 808, 814 and observed trajectories 812, 818 means that the predicted trajectories and potential trajectories 820, 822 do not overlap or only partially overlap the observed trajectories 812, 818 in results 800.

FIG. 9 is a diagram of example results 900 from an object trajectory forecasting system based on a VAE 500 that includes location uncertainties as described herein. Example results 900 include the same agents 802, 808 and 814, location histories 804, 810, 816 and observed trajectories 806, 812, 818 as illustrated in example results 800 included in FIG. 8. Results 900 include predicted trajectories and potential trajectories 920, 922 (dotted lines) determined based on including locations and uncertainties for agent for agents 808 and 814 and determining loss functions (7) based on a Bhattacharyya distance function. Techniques described herein can input agent locations and uncertainties and predicted trajectories and potential trajectories 920, 922 are more accurate and have a better relationship to observed trajectories 812, 818 than predicted trajectories and potential trajectories 820, 822 from results 800 from FIG. 8.

Figure 10:
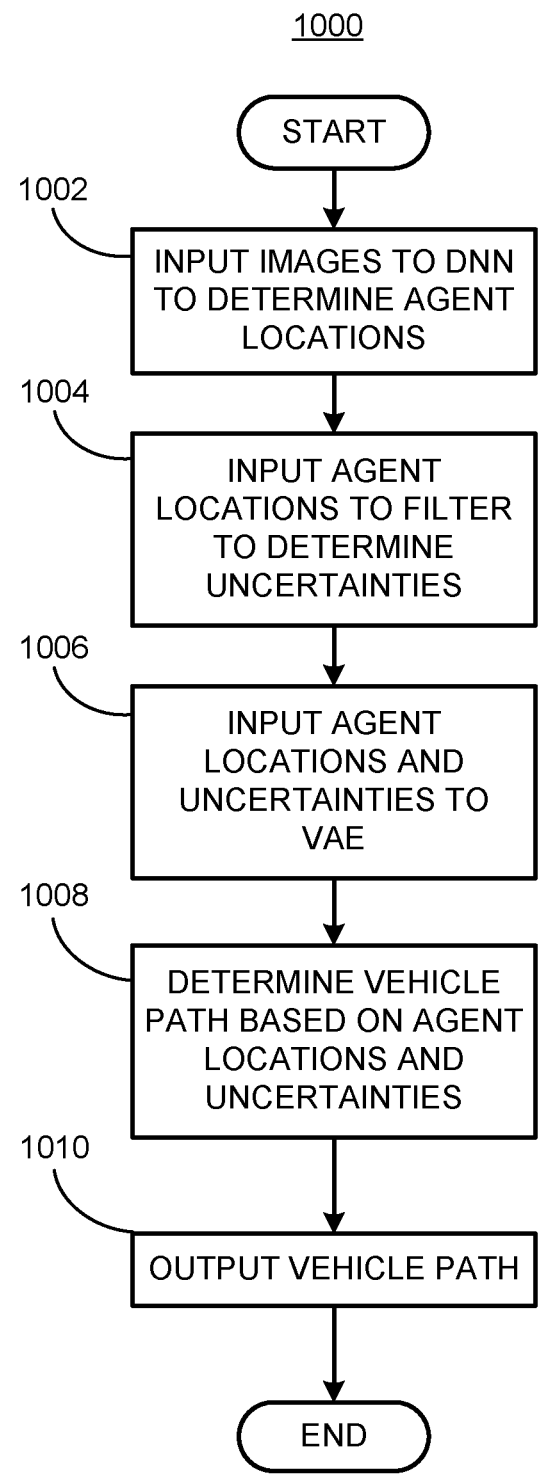
FIG. 10 is a flowchart diagram of an example process to operate a vehicle using a deep neural network.

FIG. 10 is a diagram of a flowchart, described in relation to FIGS. 1-9, of a process for object trajectory forecasting. Process 1000 can be implemented by a processor of a computing device 115 or server computer 120, taking as input information from sensors, and executing commands, and outputting agent trajectories and potential trajectories 310. Process 1000 includes multiple blocks that can be executed in the illustrated order. Process 1000 could alternatively or additionally include fewer blocks or can include the blocks executed in different orders.

Process 1000 begins at block 1002, where images acquired by sensors 116, 122 included in a traffic infrastructure system 105 or a vehicle 110 are input to a DNN 400 as described in relation to FIG. 3 to determine agent locations. The images can correspond to a time series of images, where the time step at which each image is acquired is recorded.

At block 1004 process 1000 inputs the agent locations and time step data to a filter, which can be a Kalman filter as described in relation to FIG. 3 to determine uncertainties corresponding to the agent locations.

At block 1006 process 1000 inputs the locations and uncertainties, agent location histories, and agent-agent relationships to trajectory forecasting 308 to determined predicted trajectories and potential trajectories 310 for the agents as discussed in relation to FIGS. 3, 4, 5 and 6, above.

At block 1008 process 1000 inputs predicted trajectories and potential trajectories 310 for the agents to planning and control 312. Planning and control 312 can determine a vehicle path upon which to operate a vehicle 110 based on the predicted trajectories and potential trajectories 310 as discussed above in relation to FIG. 5.

At block 1010 process 1000 outputs the vehicle path to a computing device 115 in a vehicle 110. The vehicle path can be determined by computing device 115 in vehicle 110 or server computer 120 in traffic infrastructure system 105 and either communicated to computing device 115 via an internal bus or downloaded to vehicle 110 via network 130.

At block 1012 a computing device 115 in a vehicle 110 receives the vehicle path. The computing device 115 can perform one or more of displaying the vehicle path upon a human-machine interface device such as a display, comparing the vehicle path with a vehicle path determined by the computing device 115, and operating the vehicle 110 based on the vehicle path. Operating the vehicle 110 based on the vehicle path can include determining commands to transmit to controllers 112, 113, 114 to control vehicle powertrain, steering, and brakes to operate vehicle 110 along the determined vehicle path. For example, computing device 115 can determine that predicted trajectories and potential trajectories 716, 718, 726, 724 for pedestrians 706, 708 will overlap predicted trajectories and potential trajectories 728, 730, 732, 734 for vehicle 110 and vehicle 110 should stop. Autonomous vehicle control system 300 can continue to track pedestrians 702, 704, 706, 708 to determine when predicted trajectories and potential trajectories 712, 714, 716, 718, 720, 722, 724, 726 will no longer overlap vehicle 110 trajectories and potential trajectories 728, 730, 732, 734 and vehicle 110 can continue to operate. Following block 1010 process 1000 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
a processor; and
a memory, the memory including instructions executable by the processor to:
determine a plurality of agent locations at a plurality of time steps by inputting a plurality of images to a perception algorithm that inputs the plurality of images and outputs agent labels and the agent locations;
determine a plurality of first uncertainties corresponding to the agent locations at the plurality of time steps by inputting the plurality of agent locations to a filter algorithm that inputs the agent locations and outputs the plurality of first uncertainties corresponding to the plurality of agent locations;
determine a plurality of predicted agent trajectories and potential trajectories corresponding to the predicted agent trajectories by inputting the plurality of agent locations at the plurality of time steps and the plurality of first uncertainties corresponding to the agent locations at the plurality of time steps to a variational autoencoder; and
output the plurality of predicted agent trajectories and the potential trajectories corresponding to the predicted agent trajectories.

2. The computer of claim 1, the instructions including further instructions to operate a vehicle based on the plurality of predicted agent trajectories and the potential trajectories corresponding to the predicted agent trajectories.

3. The computer of claim 2, the instructions including further instructions to operate the vehicle by controlling one or more of vehicle powertrain, vehicle brakes, and vehicle steering.

4. The computer of claim 1, wherein the perception algorithm is a deep neural network.

5. The computer of claim 4, wherein the deep neural network is a convolutional neural network that includes convolutional layers and fully connected layers.

6. The computer of claim 1, wherein the agent locations are x coordinates and y coordinates in a plane.

7. The computer of claim 6, wherein the x coordinates and the y coordinates in the plane are determined based on a high definition map.

8. The computer of claim 1, wherein the filter algorithm is a Kalman filter.

9. The computer of claim 1, wherein the first uncertainties corresponding to the agent locations at the plurality of time steps correspond to Gaussian distributions.

10. The computer of claim 1, wherein the variational autoencoder includes encoders, latent variables, and decoders.

11. The computer of claim 10, wherein the variational autoencoder includes a plurality of long short-term memory (LSTM) neural networks and one or more convolutional neural networks.

12. The computer of claim 11, wherein the latent variables include concatenated outputs from the plurality of LSTM neural networks and the one or more convolutional neural networks.

13. The computer of claim 10, wherein the variational autoencoder includes one or more recurrent neural networks that input agent locations and uncertainties and output predicted agent trajectories and the potential trajectories corresponding to the predicted agent trajectories.

14. The computer of claim 1, wherein training the variational autoencoder includes determining ground truth corresponding to the predicted agent trajectories and the potential trajectories corresponding to the predicted agent trajectories.

15. The computer of claim 1, wherein training the variational autoencoder is based on a loss function based on a Bhattacharyya distance measure.

16. The computer of claim 1, wherein the plurality of images are acquired by one or more of sensors included in a vehicle and sensors included in a traffic infrastructure system.

17. A method, comprising:
- determining a plurality of agent locations at a plurality of time steps by inputting a plurality of images to a perception algorithm that inputs the plurality of images and outputs agent labels and the agent locations;
- determining a plurality of first uncertainties corresponding to the agent locations at the plurality of time steps by inputting the plurality of agent locations to a filter algorithm that inputs the agent locations and outputs the plurality of first uncertainties corresponding to the plurality of agent locations;
- determining a plurality of predicted agent trajectories and potential trajectories corresponding to the predicted agent trajectories by inputting the plurality of agent locations at the plurality of time steps and the plurality of first uncertainties corresponding to the agent locations at the plurality of time steps to a variational autoencoder; and
- outputting the plurality of predicted agent trajectories and the potential trajectories corresponding to the predicted agent trajectories.

18. The method of claim 17, further comprising operating a vehicle based on the plurality of predicted agent trajectories and the potential trajectories corresponding to the predicted agent trajectories.

19. The method of claim 18, further comprising operating the vehicle by controlling one or more of vehicle powertrain, vehicle brakes, and vehicle steering.

20. The method of claim 17, wherein the perception algorithm is a deep neural network.

* * * * *